Aug. 3, 1954
R. H. BURNS
2,685,123
WIRE BURNISHER
Filed Jan. 14, 1952
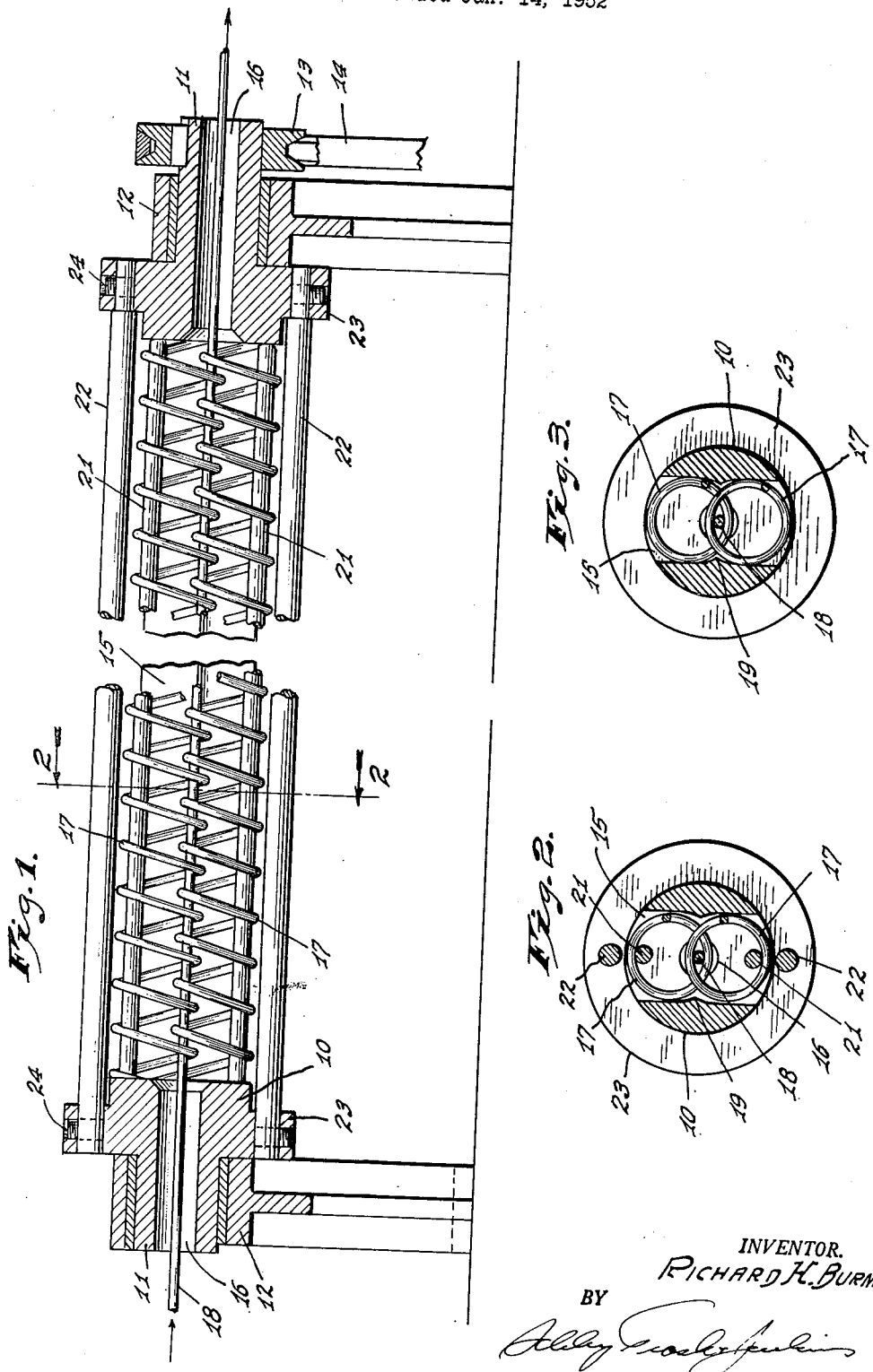
INVENTOR.
RICHARD H. BURNS
BY
ATTORNEYS.

Patented Aug. 3, 1954

2,685,123

UNITED STATES PATENT OFFICE 2,685,123

WIRE BURNISHER

Richard H. Burns, Muncie, Ind., assignor to Indiana Steel & Wire Company, Muncie, Ind., a corporation of Indiana Application January 14, 1952, Serial No. 266,269

6 Claims. (Cl. 29—90.5)

It is an object of this invention to produce a machine for burnishing the surface of longitudinally moving rods or wires. A further object of the invention is to produce a machine which can be simply and economically manufactured and which can readily be altered to vary the degree of burnishing effected. Another object is to produce a machine the burnishing elements of which are inexpensive and easily replaceable.

In carrying out the invention, I employ an elongated rotor having bearing portions at its ends. Between the bearing portions, the rotor is provided with a longitudinal slot which extends diametrically completely through the rotor and which has a width materially larger than the diameter of the rod or wire which is to be burnished. Within this slot and on opposite sides of the rotor axis I dispose two longitudinally extending, open-wound helical springs the turns of which overlap each other radially of the rotor to permit the rod or wire being burnished to pass through both springs and through axial openings in the bearing portions at the ends of the rotor. As the rotor is rotated, centrifugal force urges the springs outwardly in opposite directions and causes them to bear heavily on the surface of the rod or wire extending through them. The degree of burnishing effected can be controlled by varying the speed of the rotor or by providing the springs with auxiliary weights.

The accompanying drawing illustrates the invention: Fig. 1 is an axial section through the burnishing machine; Fig. 2 is a transverse section on the line 2—2 of Fig. 1; and Fig. 3 is a view similar to Fig. 2 illustrating a modification of the invention.

The machine shown in the drawing comprises an elongated rotor 10 having end portions 11 of reduced diameter which are rotatably received in suitable bearings 12. One of the bearing portions 11 projects outwardly beyond its associated bearing 12 to receive a pulley 13 with which a drive belt 14 co-operates.

The central portion of the rotor is provided with a longitudinal slot 15 extending completely through the rotor diametrically, as will be clear from Fig. 2. The end portions of the rotor are provided with axial openings 16 to permit the rod or wire 18 being polished to extend completely through the rotor.

Within the slot 15 I disposed two open-wound helical springs 17 which extend longitudinally of the rotor on opposite sides of the rotor axis. The springs 17 fit the slot 15 loosely enough to be freely slidable radially of the rotor, and the longitudinal walls of the slot 15 are desirably parallel so that the fit of each spring within the slot will remain substantially the same irrespective of the radial position of the spring. The slot-walls may be provided with longitudinally extending central abutments 19 serving to prevent either spring from moving across the rotor axis.

In using the burnisher, the two springs 17 are moved radially inwardly of the rotor until their turns overlap, as indicated in Figs. 2 and 3, so that the rod or wire 18 can be passed longitudinally through both springs. Thereafter, when the rotor is rotated centrifugal force will cause the springs 17 to be urged outwardly and to bear against the rod or wire 18 with a burnishing force which is dependent in magnitude on the weights of the springs and the speed of rotor-rotation. The speed of rotor-rotation may vary; but should be so proportioned to the speed of movement of the rod or wire 18 that all portions thereof will be subjected to the burnishing action.

In the arrangement illustrated in Figs. 1 and 2, auxiliary weights in the form of rods 21 are provided for the springs 17 to increase the pressure with which they bear on the rod or wire 18. Each of such rods 21 extends substantially for the full length of its associated spring and is free from the other spring. To prevent the springs and weight-rods 21 from flying outwardly in the event that the rotor is rotated with no rod or wire 18 in place, the rotor may be provided with retainer rods 22 which lie in the plane of the slot 15 and outwardly beyond the springs 17. Such rods are removable to permit insertion or replacement of the springs 17; and to that end, the rotor may be provided adjacent the bearing portions 16 with flanges 23 having aligned openings in which the rods are secured as by set screws 24. Either or both of the weights 21 and rods 22 shown in Figs. 1 and 2 may be omitted, as in the construction shown in Fig. 3. If desired, the weight-rods 21, when used, may include a coacting or sheath of soft rubber or similar yielding material to equalize the pressure exerted on the several spring turns.

It will be obvious that the burnisher is readily adaptable to the burnishing of rods or wires of different diameters; for the radial slidability of the springs in the slot 15 permits ready variation of the extent to which they overlap. The quality of the burnishing effected can be varied by varying the speed of rotor-rotation or by the use of appropriate weights 21. Either expedient varies centrifugal force and hence varies the pressure with which the spring-turns bear on the rod or wire being burnished. The only elements subject to wear in the burnishing action are the springs, which are inexpensive and can readily be replaced.

The expression "rod or wire" as used herein is intended to comprehend tubing or other elongated stock.

I claim as my invention:

1. A burnisher for burnishing a moving rod or wire, comprising a rotor having a central, longitudinal slot containing the rotor-axis, means supporting said rotor for rotation about its axis, a pair of longitudinally extending, open-wound helical springs located in said slot and radially slidable therein, said springs being disposed on opposite sides of the rotor-axis but arranged with their turns radially overlapping whereby the rod or wire to be burnished may pass through both springs along the rotor-axis, and means for rotating said rotor about its axis to cause the springs to be urged downwardly and forced against the rod or wire under the influence of centrifugal force.

2. A burnisher as set forth in claim 1 with the addition that said rotor is provided in said slot with an abutment positioned to engage each spring and prevent it from moving across the rotor-axis.

3. A burnisher as set forth in claim 1 with the addition that said slot has parallel, spring-engaging walls.

4. A burnisher for burnishing a moving rod or wire, comprising a plurality of burnishing elements each having a series of aligned, spaced, interconnected, annular turns, said elements being disposed in parallel relationship with the turns of each partially overlapping radially the turns of another, whereby the rod or wire to be burnished can be passed through all the elements, a rotor, and means supporting said rotor for rotation about the axis of the rod or wire, said rotor having members engaging said burnishing elements to maintain them in angularly spaced relation about the rod or wire and to cause them to rotate with the rotor, said burnishing elements being freely slidable radially of the rotor whereby centrifugal force will urge them outwardly into firm contact with the rod or wire.

5. A burnisher as set forth in claim 4 with the addition of means on said rotor for limiting outward movement of each burnishing element under the influence of centrifugal force.

6. A burnisher as set forth in claim 1 with the addition of an elongated weight extending through each spring and movable therewith radially of the rotor.

References Cited in the file of this patent

UNITED STATES PATENTS

| Number | Name | Date |
|---|---|---|
| 267,614 | Tasker et al. | Nov. 14, 1882 |
| 997,167 | Werth | July 4, 1911 |
| 1,454,166 | Heany | May 8, 1923 |
| 1,591,017 | Cook | July 6, 1926 |
| 2,391,793 | Mische | Dec. 25, 1945 |

FOREIGN PATENTS

| Number | Country | Date |
|---|---|---|
| 574,957 | Germany | Apr. 21, 1933 |
| 579,593 | France | Oct. 20, 1924 |